Nov. 30, 1954     G. A. PHELAN     2,695,966
MULTIPLE GENERATOR SYSTEM
Filed Aug. 15, 1952
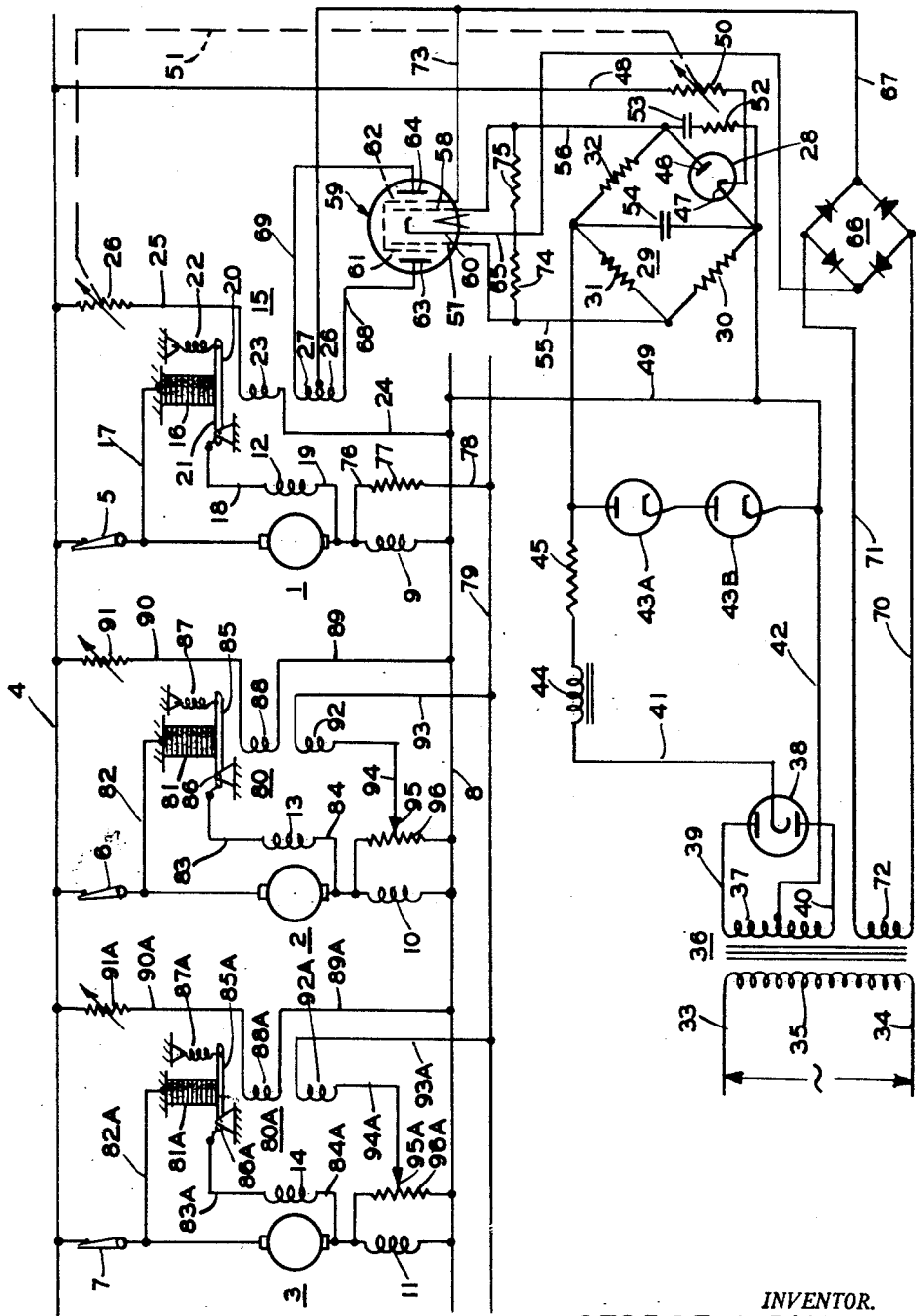
INVENTOR.
GEORGE A. PHELAN
BY
ATTORNEY United States Patent Office 2,695,966
Patented Nov. 30, 1954

2,695,966

MULTIPLE GENERATOR SYSTEM

George A. Phelan, East Orange, N. J., assignor to Bendix Aviation Corporation, Teterboro, N. J., a corporation of Delaware Application August 15, 1952, Serial No. 304,463

7 Claims. (Cl. 307—57)

The present invention relates to a multiple generator system and more particularly to means for regulating the voltages in such a system.

In multiple generator systems, an equalizing winding is used in connection with the voltage regulator to insure a proper distribution of the load. However, the equalizer windings have a tendency to cause a voltage droop in the system thus making it difficult to maintain the regulated voltage at the desired value.

In the present invention, one of the generators is provided with a regulator capable of holding the regulated voltage with extreme accuracy and is used to regulate the system bus. A resistor replaces the equalizer winding. The regulators of the other generator are controlled by the system bus voltage and are provided with equalizer windings to insure the proper distribution of the load. In a system of this type, the system bus voltage is not affected by the equalizer windings and hence the voltage droop caused by the action of the equalizer windings is eliminated.

It is an object of the invention to provide an improved multiple generator system.

Another object of the invention is to provide novel means for regulating the system voltage of a multiple generator system.

Another object of the invention is to provide a system for paralleling a plurality of generators without voltage droop.

The above and other objects and features of the invention will appear more fully hereinafter from a consideration of the following description taken in connection with the accompanying drawing wherein one embodiment of the invention is illustrated by way of example.

In the drawing:

The single figure is a schematic diagram of a multiple generator system embodying the invention.

Referring now to the drawing, there is shown a plurality of direct current generators 1, 2 and 3 for supplying power to system bus 4. While only three generators are illustrated, it is understood that it is not limited to three but may be any number. In the example illustrated, the positive terminals of the generators 1, 2 and 3 are connected to the system bus 4 through switches 5, 6 and 7, respectively, and the negative terminals of the generators are connected to a ground bus 8 through series and/or interpole and compensating windings 9, 10 and 11, respectively. While the switches 5, 6 and 7 are illustrated as manually operated, it is understood that they may be any of the types known to the art for connecting generators to the system bus. The generators 1, 2 and 3 are provided with shunt field windings 12, 13 and 14, respectively.

The generator 1 serves as a slave to keep the system at a constant voltage. The voltage of the generator 1 is held with extreme accuracy by means of an accurate voltage regulator 15 such as the type described and claimed in copending application Serial No. 299,531, filed July 18, 1952.

The regulator 15 has a variable resistance element, such as, for example, a carbon pile 16 connected in series with the shunt field winding 12 by conductors 17, 18 and 19 across the output of the generator 1. The regulator 15 is illustrated diagrammatically as including an armature 20 pivoted at 21 and biased under tension of a spring 22 in a direction tending to decrease the resistance of the pile 16 and thereby increasing the energization of the winding 12 so as to effect an increase in the voltage output of the generator.

A main electromagnet winding 23 biases the armature 20 in a direction opposing the spring 22 and tending to increase the resistance of the pile 16 thereby decreasing the energization of the winding 12 and hence decrease the output voltage of the generator 1. One end of the winding 23 is connected by conductor 24 to the conductor 8. The other end of the winding 23 is connected by a conductor 25 to the bus 4. A variable resistor 26 may be inserted in the conductor 25 to adjust the voltage setting of the regulator 15.

In addition to the main winding 23, the regulator has a pair of trimmer windings 26 and 27 which coact with the main winding 23 to provide accurate regulation. The energization of the windings 26 and 27 is controlled by a network in accordance with the condition of a temperature limited diode 28 which forms one leg of a bridge circuit 29. Resistors 30, 31 and 32 form the other legs of the bridge 29.

The bridge 29 is energized from a source of alternating current (not shown) connected by conductors 33 and 34 to primary winding 35 of a transformer 36. Secondary winding 37 of the transformer 36 is connected across the input of a full wave rectifier 38 by conductors 39 and 40. The output of the rectifier 38 is connected by a conductor 41 to one input terminal of the bridge 29. The other input terminal of the bridge 29 is connected by a conductor 42 to the mid point of the winding 37. In order to provide a constant voltage for the input to the bridge circuit, a pair of voltage regulator tubes 43A and 43B are connected in series across the input of the bridge 29. The voltage regulator tubes 43A and 43B are of the type that change resistance with change in voltage and thereby maintain a constant potential drop thereacross. An inductance 44 to filter the ripple from the output of the rectifier 38 and a resistor 45 to limit the current in the tubes 43A and 43B may be inserted in the conductor 41.

The temperature limited diode 28 has a plate 46 and a cathode 47. The cathode or filament 47 is connected across the output of the generator 1 by conductors 48 and 49. A variable resistance 50 may be inserted in the conductor 48 to adjust the voltage setting of the regulated voltage. The resistance 50 may be mechanically coupled with the resistance 26 as indicated by the dashed line 51. A resistor 52 and capacitor 53 may be connected across the tube 28 to prevent hunting. A stabilizing capacitor 54 may be connected across the input of the bridge 29.

The output terminals of the bridge 29 are connected by conductors 55 and 56 to respective grids 57 and 58 of a double beam power amplifier tube 59. The tube 59 in addition to the grids 57 and 58 has a cathode 60, screen grids 61 and 62 and plates 63 and 64. The cathode 60 is connected by conductor 65 to the output terminal of a rectifier 66. The + output terminal of the rectifier 66 is connected by conductor 67 to a common junction point of the windings 26 and 27. The other end of the windings 26 and 27 are connected by conductors 68 and 69 to the respective plates 63 and 64. The input of the rectifier 66 is connected by conductors 70 and 71 across a secondary winding 72 of the transformer 36.

The screen grids 61 and 62 are tied together and connected by conductor 73 to the conductor 67. Grid biasing resistors 74 and 75 are connected between the respective grids 57 and 58 and the cathode 60.

The negative terminal of the generator 1 is connected by conductor 76, resistor 77 and conductor 78 to an equalizer bus 79. The function of this equalizer connection will be explained later.

The generators 2 and 3 are provided with regulators indicated generally by the numerals 80 and 80A which function to control the energization of the respective shunt field windings 13 and 14.

The regulator 80 has a variable resistance element 81 connected in series with the shunt field winding 13 by conductors 82, 83 and 84 across the output of the generator 12. The regulator 15 is illustrated diagrammatically as including an armature 85 pivoted at 86 and biased under tension of a spring 87 in a direction tending to decrease the resistance of the resistance element or carbon pile 81 and thereby increasing the energization of the winding 13 so as to effect an increase in the voltage output of the generator.

A main electromagnetic winding 88 biases the armature 85 in a direction opposing the spring 87 and tending to increase the resistance of the pile 81 thereby decreasing the energization of the winding 13 and hence decrease the output voltage of the generator 2. One end of the winding 88 is connected by a conductor 89 to the grounded bus 8 and the other end of the winding 88 is connected by a conductor 90 to the bus 4. A variable resistor 91 may be inserted in the conductor 90 to adjust the voltage setting of the regulator 80.

In addition to the main winding 88, the regulator 80 has an equalizer winding 92, one end of which is connected by a conductor 93 to the equalizer bus 79. The other end of the equalizer winding 92 is connected by a conductor 94 to a movable tap 95 on resistor 96. The resistor 96 is connected between the armature end of series and/or interpole and series windings of generator 2 and the grounded bus 8.

The regulator 80A of the generator 3 is connected similar to that of generator 2 as would be any other number of generators as might be connected to the system.

In the operation of the system, the accurate regulator of the generator 1 maintains the bus voltage at the predetermined value and serves as a slave to keep the system at the constant voltage. Inasmuch as it has no equalizer winding, the voltage droop normally produced by the action of the equalizer windings is eliminated. The resistor 77 connecting the negative terminal of the generator 1 to the equalizer bus has a value substantially that of the resistance of an equalizer winding of one of the other generators.

The equalizer windings of the other generators maintain a properly distributed load on all parts of the system and coact with the main windings of the other regulators to regulate the voltage of the associated generators so that it maintains the predetermined value as determined by the generator 1.

Although only one embodiment of the invention has been illustrated and described, various changes in the form and relative arrangement of the parts, which will now appear to those skilled in the art, may be made without departing from the scope of the invention.

What is claimed is:

1. In a multiple generator system, the combination comprising a plurality of generators connected to a common bus, one of said generators having an accurate voltage regulator associated therewith and adapted to maintain a predetermined voltage on said bus, an equalizer bus, a resistor connecting said one generator to said equalizer bus, the other of said generators having a voltage regulator associated therewith, said other voltage regulators having an equalizer winding connecting said other generators to said equalizer bus to maintain a proper distribution of load.

2. In a multiple generator system, the combination comprising a plurality of generators connected to a load bus, a voltage regulator associated with each of said generators, an equalizer bus, means for connecting one of said generators to said equalizer bus independent of the regulator associated therewith, and means including an equalizer winding in each of said other regulators for connecting the other of said generators to said equalizer bus.

3. A multiple generator system, comprising a plurality of generators connectable to a load bus, one of said generators having a voltage regulator associated therewith and connected to maintain a predetermined voltage on said load bus, the other of said generators having voltage regulators associated therewith, said other regulators having a first control winding responsive to the voltage of said load bus to maintain the output voltage of its associated generator substantially the same as the voltage of said load bus, and a second winding responsive to load conditions in said system to aid said first winding in maintaining said output voltages of said other generators substantially the same as the voltage of said load bus.

4. A multiple generator system comprising, a plurality of generators connectable to a load bus, voltage regulators associated with each of said generators, an equalizer bus, one of said generators and associated regulator being adapted to maintain the voltage of said load bus at a predetermined value, and the other of said regulators having a control winding responsive to said load bus voltage and a second control winding responsive to current flow in said equalizer bus to maintain said other generator output voltages at said load bus voltage.

5. In a multiple generator system having a plurality of generators connected for parallel operation, each of said generators having a voltage regulator associated therewith, the combination comprising an equalizer bus, circuit means connecting one of said generators to said equalizer bus, and means including an equalizer winding in the associated regulator for connecting the other of said generators to said equalizer bus.

6. Apparatus for use in a multiple generator system having a plurality of generators connected to a common load bus, comprising a voltage regulator for each of said generators, an equalizer bus, a connection between one of said generators and said equalizer bus independent of the regulator associated therewith, and means including equalizer windings in the regulators for connecting the other of said generators to said equalizer bus.

7. Apparatus for use in a multiple generator system having a plurality of generators connected to a common load bus, comprising a voltage regulator for one of said generators, said regulator being adapted to maintain a predetermined voltage on said load bus, an equalizer circuit, voltage regulators for the other of said generators, said last regulators having an equalizer winding connected in said equalizer circuit, and means connecting said first generator to said equalizer circuit independent of said first regulator so that the load bus voltage is not affected by the action of said equalizer windings.

References Cited in the file of this patent

UNITED STATES PATENTS

| Number | Name | Date |
|---|---|---|
| 2,401,795 | Rady | June 11, 1946 |
| 2,494,397 | Lusk | Jan. 10, 1950 |